(12) United States Patent
Folkes et al.

(10) Patent No.: US 7,768,924 B2
(45) Date of Patent: Aug. 3, 2010

(54) USING A LINK ATTRIBUTE TO INFORM NODES OF THE AVAILABILITY OF TRAFFIC MANAGEMENT RESOURCES

(75) Inventors: Ronald P. Folkes, Addison, TX (US); Calvin Wan, Plano, TX (US); Chenjiang Hu, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 11/863,461

(22) Filed: Sep. 28, 2007

(65) Prior Publication Data
US 2009/0086632 A1 Apr. 2, 2009

(51) Int. Cl.
*H04L 12/26* (2006.01)
(52) U.S. Cl. ............... 370/235; 370/230; 370/252
(58) Field of Classification Search ......... 370/230, 370/230.1, 231, 232, 235, 236, 237, 238, 370/252
See application file for complete search history.

(56) References Cited

U.S. PATENT DOCUMENTS

| | | | | |
|---|---|---|---|---|
| 5,687,168 | A * | 11/1997 | Iwata | 370/255 |
| 6,459,682 | B1 * | 10/2002 | Ellesson et al. | 370/235 |
| 6,683,852 | B2 * | 1/2004 | Nagarajan et al. | 370/235 |
| 7,287,086 | B2 * | 10/2007 | Krissell | 709/232 |
| 7,324,447 | B1 * | 1/2008 | Morford | 370/231 |
| 7,450,513 | B2 * | 11/2008 | Okamura et al. | 370/235 |
| 7,567,512 | B1 | 7/2009 | Minei et al. | 370/232 |
| 7,706,357 | B1 | 4/2010 | Dyckerhoff et al. | 370/352 |
| 2002/0191539 | A1 * | 12/2002 | Rawlins et al. | 370/229 |
| 2004/0196787 | A1 * | 10/2004 | Wang et al. | 370/229 |
| 2004/0228276 | A1 * | 11/2004 | Courtney | 370/230 |
| 2008/0165703 | A1 * | 7/2008 | Deng | 370/254 |
| 2008/0198755 | A1 * | 8/2008 | Vasseur et al. | 370/248 |
| 2008/0212496 | A1 * | 9/2008 | Zou | 370/255 |
| 2008/0239976 | A1 * | 10/2008 | Altman | 370/252 |
| 2009/0086633 | A1 * | 4/2009 | Hu et al. | 370/232 |
| 2009/0182874 | A1 * | 7/2009 | Morford et al. | 709/224 |

OTHER PUBLICATIONS

Donnell, Annette K., "*Deploying MPLS Traffic Engineering*", Application Note, www.juniper.net, Copyright © 1999, Juniper Networks, Inc., 7 pages, Oct. 15, 1999.
Zubairi, Junaid Ahmed, "*An Automated Traffic Engineering Algorithm for MPLS-Diffserv Domain*", http://www.cs.fredonia.edu/zubairi/A280_Zubairi.pdf, 2002, 6 pages, 2002.
"*Traffic Engineering Solutions for Core Networks*", A Paper in the Backbone Network and Business Solutions Series, Technical Paper, www.alcatel.com, Copyright © 2002 Alcatel, 23 pages, 2002.
United States Office Action; U.S. Appl. No. 11/865,771; pp. 21, Sep. 24, 2009.
Final Office Action, U.S. Appl. No. 11/865,771, 18 pages, May 11, 2010.

* cited by examiner

*Primary Examiner*—Chi H. Pham
*Assistant Examiner*—Kevin Mew
(74) *Attorney, Agent, or Firm*—Baker Botts L.L.P.

(57) ABSTRACT

In one embodiment, informing nodes of traffic management resource availability includes establishing whether there is an available traffic management resource at a first node, where a traffic management resource tracks usage of bandwidth by a tunnel at the first node. Whether there is an available traffic management resource is recorded in a traffic management link attribute. The traffic management link attribute is sent to second nodes to inform the second nodes of whether there is an available traffic management resource at the first node.

14 Claims, 3 Drawing Sheets

US 7,768,924 B2

USING A LINK ATTRIBUTE TO INFORM NODES OF THE AVAILABILITY OF TRAFFIC MANAGEMENT RESOURCES

TECHNICAL FIELD

This invention relates generally to the field of communication networks and more specifically to using a link attribute to inform nodes of the availability of traffic management resources.

BACKGROUND

Communication networks may include tunnels through which nodes can communicate packets. In certain systems, a tunnel is assigned a traffic management resource (TMR) that manages the bandwidth used by the tunnel. A node typically has a fixed number of traffic management resources, so only a fixed number of tunnels can be configured through the node. In certain cases, a source node does not know the availability of traffic management resources at each node. If the source node attempts to set up a tunnel through a node that has no available traffic management resources, the tunnel set up fails.

SUMMARY OF THE DISCLOSURE

In accordance with the present invention, disadvantages and problems associated with previous techniques for utilizing traffic management resources may be reduced or eliminated.

In one embodiment, informing nodes of traffic management resource availability includes establishing whether there is an available traffic management resource at a first node, where a traffic management resource tracks usage of bandwidth by a tunnel at the first node. Whether there is an available traffic management resource is recorded in a traffic management link attribute. The traffic management link attribute is sent to second nodes to inform the second nodes of whether there is an available traffic management resource at the first node.

Certain embodiments of the invention may provide one or more technical advantages. A technical advantage of one embodiment may be that a node informs other nodes of traffic management resource availability at the node. The node sends a traffic management link attribute that indicates whether the node has an available traffic management resource. Another technical advantage of one embodiment may be that a source node can use the traffic management resource availability information to select nodes to set up a tunnel.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
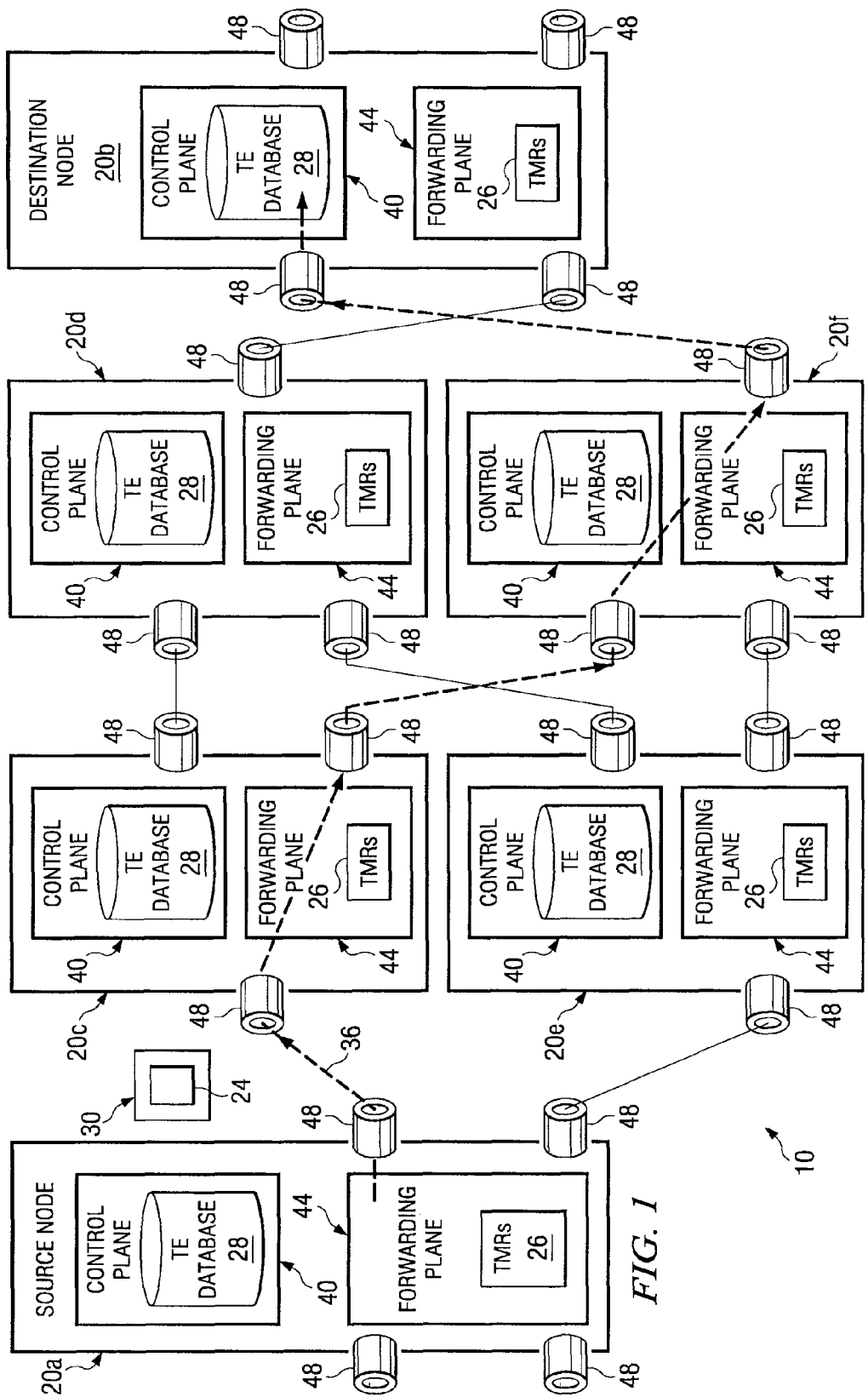
FIG. 1 illustrates an example of a system in which a node may inform other nodes of the availability of traffic management resources at the node.

FIG. 1 illustrates an example of a system 10 in which a node 20 may inform other nodes 20 of the availability of traffic management resources 26 at the node 20. In the example, a node 20c sends a message 30 that includes traffic management resource (TMR) availability information 24. TMR availability information 24 comprises a traffic management link attribute that indicates whether node 20c has an available traffic management resource. A source node 20a can use the TMR availability information 24 to select nodes 20 to set up a tunnel 36.

In one embodiment, system 10 communicates information through signals such as optical signals. An optical signal may have any suitable data rate. Information may include voice, data, audio, video, multimedia, control, signaling, and/or other information.

In the illustrated example, system 10 includes nodes 20a-20f through which tunnel 36 may be set up. A node 20 may represent a Label Switching Router (LSR). A tunnel 36 may be a label switched path (LSP) that includes a sequence of nodes 20. Packets travel from a source node 20a, through zero, one, or more intermediate nodes 20c and 20f, to a destination node 20b. In one embodiment, source node 20 encapsulates packets in Multi-Protocol Label Switching (MPLS) packets. Intermediate nodes 20c and 20f forward packets based on the MPLS encapsulation. Destination node 20b de-encapsulates the MPLS packets to yield the original packets.

A node 20 includes a control plane 40, a forwarding plane 44, and ports 48. Control plane 40 determines the path of tunnel 36 to destination node 20b. Control plane 40 sets up a routing table that specifies ports 48 through which packets for destination node 20b should be routed. Control plane 40 includes a traffic engineering database 28 that stores traffic management information, such as TMR availability information 24 of nodes 20.

Forwarding plane 44 forwards packets according to the routing table. Forwarding plane 44 includes traffic management resources (TMRs) 26. A traffic management resource 26 is assigned to a particular tunnel 36 and is used to ensure that the traffic going through tunnel 36 does not exceed the bandwidth reserved for tunnel 36.

TMR availability information 24 for a node 20 describes the availability of traffic management resources 26 of node 20 for use by tunnels 36. The availability may indicate, for example, whether a traffic management resource is available at node 20 or the number of available traffic management resources at node 20.

A node 20b informs other nodes 20 (including source node 20a) of the availability of traffic management resources 26 by sending a message 30 that includes TMR availability information 24. In one embodiment, TMR availability information 24 describes whether a traffic management resource 26 is available at node 20. TMR availability information 24 is recorded as a traffic management resource (TMR) availability value of a traffic management link attribute. For example, a bit for the attribute is set to one to indicate that a resource 26 is available, and the bit is set to zero to indicate that no resource 26 is available.

In one embodiment, node 20*b* sends updates to TMR availability information 24 in link state advertisement messages. To control the number of updates, a damping control mechanism like bandwidth update may be used to reduce the updates.

In one embodiment, tunnel 36 has an affinity mask that designates link attributes that nodes 20 of tunnel 36 should have. Control plane 40 of source node 20*a* selects nodes 20 that satisfy the affinity mask of tunnel 36. In the embodiment, the affinity mask includes a tunnel affinity attribute to indicate whether tunnel 36 requires a traffic management resource 26. Control plane 40 selects nodes 20 with a traffic management link attribute that indicates that the nodes 20 have an available traffic management resource 26.

A component of system 10, such as a node 20*a*-20*f,* may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic, and may be stored in memory. Certain logic, such as a processor, may manage the operation of a component. Examples of a processor include one or more computers, one or more microprocessors, one or more applications, and/or other logic.

A memory stores information. A memory may comprise a computer-readable storage medium, such as computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable storage medium.

Modifications, additions, or omissions may be made to system 10 without departing from the scope of the invention. The components of system 10 may be integrated or separated. Moreover, the operations of system 10 may be performed by more, fewer, or other components. Additionally, operations of system 10 may be performed using any suitable logic. As used in this document, "each" refers to each member of a set or each member of a subset of a set.

Figure 2:
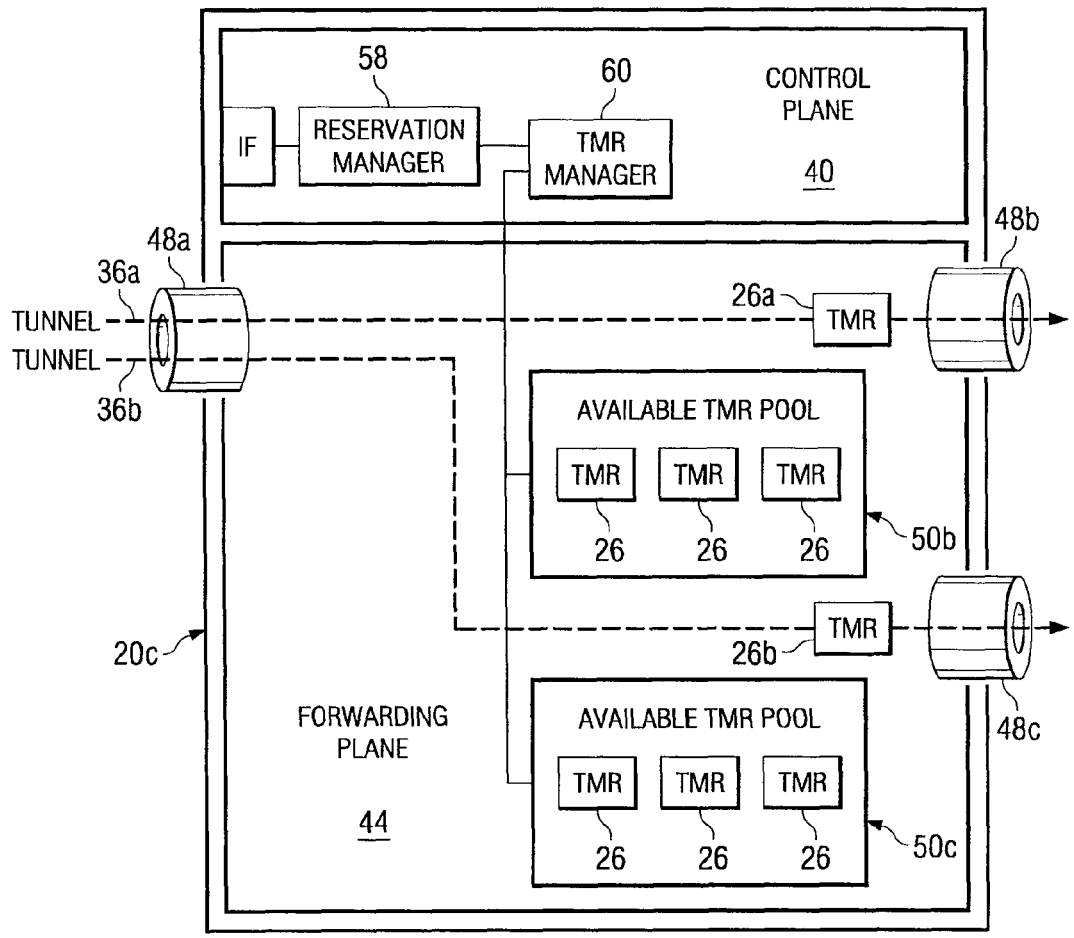
FIG. 2 illustrates an example of an intermediate node that may be used with the system of FIG. 1.

FIG. 2 illustrates an example of an intermediate node 20*c* that may be used with system 10 of FIG. 1. Node 20*c* includes ports 48*a*-48*c*, traffic management resources 26, TMR manager 60, and a reservation manager 58. Tunnel 36*a* traverses port 48*a* and port 48*b,* and tunnel 36*b* traverses port 48*a* and 48*c*.

Available TMR pool 50 includes traffic management resources 26 available at a particular port 48. Traffic management resources 26 that are in use (and thus not available) are located at tunnels 36. In the illustrated embodiment, tunnel 36*a* uses traffic management resource 26*a*, and tunnel 36*b* uses traffic management resource 26*b*.

Reservation manager 58 reserves resources for tunnels 36. TMR manager 60 tracks available traffic management resources 26 and assigns available traffic management resources 26 to tunnels 36. Reservation manager 58 checks with TMR manager 60 to determine if there is an available traffic management resource 26 before reserving resource 26.

TMR manager 60 determines TMR availability information 24, and records information 24 in message 30 for distribution to other nodes 20. In one embodiment, TMR manager 60 determines whether there is an available traffic management resource 26, and records the availability in a traffic management link attribute.

In one embodiment, TMR manager 60 calculates a percentage of traffic management resources 26 that are in use. If the in-use percentage exceeds a threshold (such as greater than 90%, 95%, or 98%), TMR manager 60 determines that there is not an available traffic management resource 26. Otherwise, TMR manager 60 determines that there is an available traffic management resource 26.

Modifications, additions, or omissions may be made to node 20 without departing from the scope of the invention. The components of node 20 may be integrated or separated. Moreover, the operations of node 20 may be performed by more, fewer, or other components. For example, the operations of reservation manager 58 may be performed by more than one component. Additionally, operations of node 20 may be performed using any suitable logic.

Figure 3:
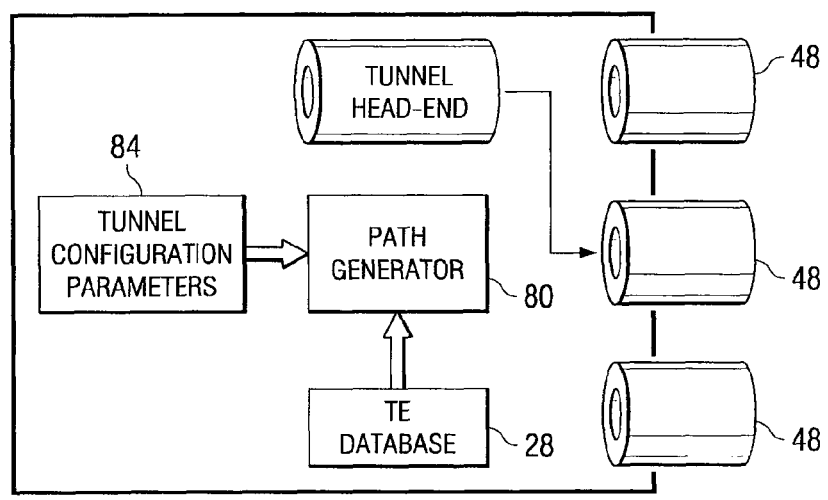
FIG. 3 illustrates an example of a source node that may be used with the system of FIG. 1.

FIG. 3 illustrates an example of source node 20*a* that may be used with system 10 of FIG. 1. Source node 20*a* includes a traffic engineering database 28, ports 48, and a path generator 80. Traffic engineering database 28 stores TMR availability information 24 that describes traffic management resources 26 available at nodes 20.

Path generator 80 computes a path for tunnel 36, and may use a Constrained Shortest Path First (CSPF) technique to compute the path. Path generator 80 computes a path in accordance with tunnel configuration parameters 84. Tunnel configuration parameters 84 may designate the source node 20*a* of tunnel 36, destination node 20*b* of tunnel 36, and bandwidth required for tunnel 36.

In one embodiment, path generator 80 establishes that tunnel 36 requires a traffic management resource 26. Path generator 80 uses TMR availability information 24 from traffic engineering database 28 to select nodes 20 that have an available traffic management resource 26.

Modifications, additions, or omissions may be made to source node 20*a* without departing from the scope of the invention. The components of node 20*a* may be integrated or separated. Moreover, the operations of node 20*a* may be performed by more, fewer, or other components. Additionally, operations of node 20*a* may be performed using any suitable logic.

Figure 4:
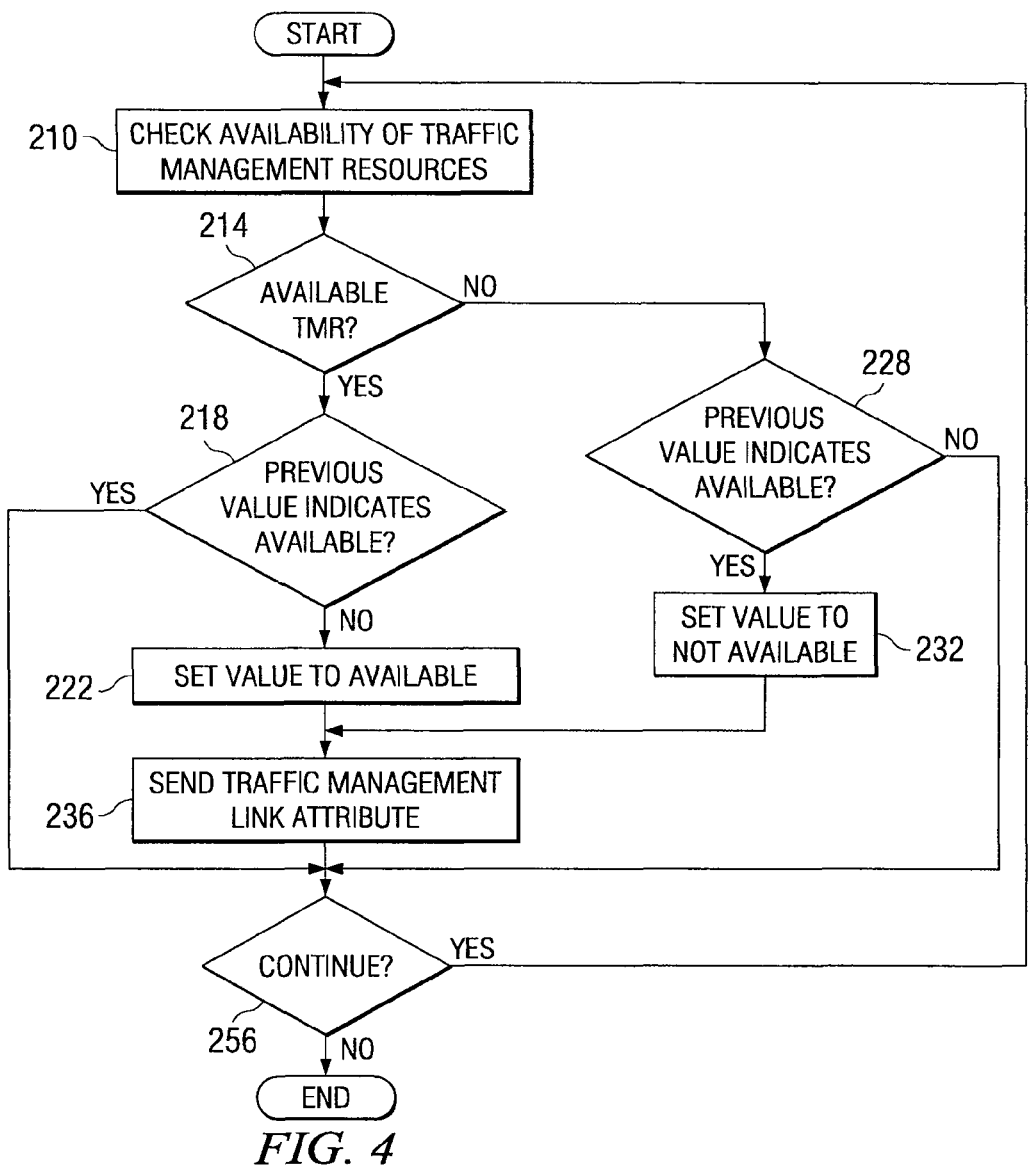
FIG. 4 illustrates an example of a method for informing nodes of the availability of traffic management resources that may be used by system of FIG. 1.

FIG. 4 illustrates an example of a method for informing nodes 20 of the availability of traffic management resources 26 that may be used by system 10 of FIG. 1. The method begins at step 210, where TMR manager 60 checks the availability of the traffic management resources 26.

TMR manager 60 determines whether there is an available traffic management resource 26 at step 214. In one embodiment, TMR manager 60 calculates an in-use percentage of traffic management resources 26. If the in-use percentage exceeds a threshold, TMR manager 60 determines that there are no available traffic management resources 26. Otherwise, TMR manager 60 determines that there is an available traffic management resource 26.

If there is an available traffic management resource at step 214, then the method moves to step 218. At step 218, the TMR availability value of a traffic management link attribute may indicate either that there is or is not an available traffic management resource 26. If the previous value indicates there is an available traffic management resource 26, then the method moves to step 256. If the previous value indicates there is no available traffic management resource 26, then the method moves to step 222, where the value is set to indicate that there is an available traffic management resource 26. TMR manager 60 sends the traffic management link attribute that records TMR availability information 24 at step 236. The link attribute is sent in message 30. The method then moves to step 256.

If there is no available traffic management resource 26 at step 214, then the method moves to step 228. At step 228, the previous value of the traffic management link attribute may indicate either that there is or is not an available traffic management resource 26. If the previous value indicates there is no available traffic management resource 26, then the method moves to step 256. If the previous value indicates there is an available traffic management resource 26, then the method moves to step 232, where the value is set to indicates that there is no available traffic management resource 26. TMR manager 60 sends the traffic management link attribute that records TMR availability information 24 at step 236. The link attribute is sent in message 30. The method then moves to step 256.

The method may be continued at step 256. If the method is to be continued, the method returns to step 210 to check the availability of traffic management resources 26. If the method is not to be continued at step 256, the method terminates.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a node informs other nodes of traffic management resource availability at the node. The node sends a traffic management link attribute that indicates whether the node has an available traffic management resource. Another technical advantage of one embodiment may be that a source node can use the traffic management resource availability information to select nodes to set up a tunnel.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for informing one or more nodes of traffic management resource availability, comprising:
    establishing whether there is an available traffic management resource at a first node, a traffic management resource operable to track usage of bandwidth by a tunnel at the first node;
    recording whether there is an available traffic management resource in a traffic management link attribute; and
    sending the traffic management link attribute to one or more second nodes to inform the one or more second nodes of whether there is an available traffic management resource at the first nodes;
    wherein recording whether there is an available traffic management resource in a traffic management link attribute further comprises:
    if there is an available traffic management resource, then:
        if a previous value of the traffic management link attribute indicates there is an available traffic management resource, then maintaining the previous value; and
        if a previous value of the traffic management link attribute indicates there is no available traffic management resource, then set a current value to indicate that there is an available traffic management resource.

2. The method of claim 1, wherein recording whether there is an available traffic management resource in a traffic management link attribute further comprises:
    if there is no available traffic management resource, then:
        if a previous value of the traffic management link attribute indicates there is an available traffic management resource, then set a current value to indicate that there is not an available traffic management resource; and
        if a previous value of the traffic management link attribute indicates there is no available traffic management resource, then maintaining the previous value.

3. The method of claim 1, wherein establishing whether there is an available traffic management resource at a first node further comprises:
    determining an in-use percentage of traffic management resources at the first node; and
    if the in-use percentage exceeds a threshold, establish that there is no available traffic management resource.

4. The method of claim 1, further comprising:
    receiving a request for a tunnel; and
    assigning the available traffic management resource to the tunnel.

5. An apparatus operable to inform one or more nodes of traffic management resource availability, comprising:
    a memory;
    logic embodied in the memory and operable to:
        establish whether there is an available traffic management resource at a first node, a traffic management resource operable to track usage of bandwidth by a tunnel at the first node; and
        record whether there is an available traffic management resource in a traffic management link attribute; and
    an interface operable to:
        send the traffic management link attribute to one or more second nodes to inform the one or more second nodes of whether there is an available traffic management resource at the first nodes;
    the logic further operable to record whether there is an available traffic management resource in a traffic management link attribute by:
    if there is an available traffic management resource, then:
        if a previous value of the traffic management link attribute indicates there is an available traffic management resource, then maintaining the previous value; and
        if a previous value of the traffic management link attribute indicates there is no available traffic management resource, then set a current value to indicate that there is an available traffic management resource.

6. The apparatus of claim 5, the logic further operable to record whether there is an available traffic management resource in a traffic management link attribute by:
    if there is no available traffic management resource, then:
        if a previous value of the traffic management link attribute indicates there is an available traffic management resource, then set a current value to indicate that there is not an available traffic management resource; and
        if a previous value of the traffic management link attribute indicates there is no available traffic management resource, then maintaining the previous value.

7. The apparatus of claim 5, the logic further operable to establish whether there is an available traffic management resource at a first node by:
    determining an in-use percentage of traffic management resources at the first node; and if the in-use percentage exceeds a threshold, establish that there is no available traffic management resource.

8. The apparatus of claim 5, the logic further operable to:
receive a request for a tunnel; and
assign the available traffic management resource to the tunnel.

9. A non-transitory computer-readable storage medium embodied with logic operable to inform one or more nodes of traffic management resource availability, and the logic when executed by a computer operable to:
establishing whether there is an available traffic management resource at a first node, a traffic management resource operable to track usage of bandwidth by a tunnel at the first node;
recording whether there is an available traffic management resource in a traffic management link attribute; and
sending the traffic management link attribute to one or more second nodes to inform the one or more second nodes of whether there is an available traffic management resource at the first node;
wherein recording whether there is an available traffic management resource in a traffic management link attribute further comprises:
if there is available traffic management resource, then:
if a previous value of the traffic management link attribute indicates there is an available traffic management resource, then maintaining the previous value; and
if a previous value of the traffic management link attribute indicates there is no available traffic management resource, then set a current value to indicate that there is an available traffic management resource.

10. The non-transitory computer-readable storage medium of claim 9, further operable to record whether there is an available traffic management resource in a traffic management link attribute by:
if there is no available traffic management resource, then:
if a previous value of the traffic management link attribute indicates there is an available traffic management resource, then set a current value to indicate that there is not an available traffic management resource; and
if a previous value of the traffic management link attribute indicates there is no available traffic management resource, then maintaining the previous value.

11. The non-transitory computer-readable storage medium of claim 9, further operable to establish whether there is an available traffic management resource at a first node by:
determining an in-use percentage of traffic management resources at the first node; and
if the in-use percentage exceeds a threshold, establish that there is no available traffic management resource.

12. The non-transitory computer-readable storage medium of claim 9, further operable to:
receive a request for a tunnel; and
assign the available traffic management resource to the tunnel.

13. A method for setting up a tunnel, comprising:
receiving one or more traffic management link attributes, a traffic management link attribute associated with a first node of one or more first nodes, a traffic management link attribute indicating whether there is an available traffic management resource at the associated first node, a traffic management resource operable to track usage of bandwidth by a tunnel at the associated first node; and
if a tunnel requires a traffic management resource for one or more nodes of the tunnel, setting up the tunnel using a first node only if there is an available traffic management resource at the first node, wherein setting up the tunnel using a first node further comprises selecting a first node with a traffic management link attribute indicating that there is an available traffic management resource at the first node if the tunnel has an affinity mask indicating that the tunnel requires a traffic management resource.

14. An apparatus operable to set up a tunnel, comprising:
a memory;
an interface operable to:
receive one or more traffic management link attributes, a traffic management link attribute associated with a first node of one or more first nodes, a traffic management link attribute indicating whether there is an available traffic management resource at the associated first node, a traffic management resource operable to track usage of bandwidth by a tunnel at the associated first node; and
logic embodied in the memory and operable to:
if a tunnel requires a traffic management resource for one or more nodes of the tunnel, set up the tunnel using a first node only if there is an available traffic management resource at the first node, wherein setting up the tunnel using a first node further comprises selecting a first node with a traffic management link attribute indicating that there is an available traffic management resource at the first node if the tunnel has an affinity mask indicating that the tunnel requires a traffic management resource.

* * * * *